United States Patent
Fertman et al.

(10) Patent No.: US 12,252,797 B2
(45) Date of Patent: Mar. 18, 2025

(54) HYDROGEN GENERATING ELEMENT

(71) Applicant: 2706649 Ontario Ltd, Aurora (CA)

(72) Inventors: Mark Fertman, Toronto (CA); Gerard Campeau, Newmarket (CA)

(73) Assignee: 2706649 Ontario Ltd, Aurora (CA)

( * ) Notice: Subject to any disclaimer, the term of this patent is extended or adjusted under 35 U.S.C. 154(b) by 874 days.

(21) Appl. No.: 17/409,626

(22) Filed: Aug. 23, 2021

(65) Prior Publication Data

US 2022/0056603 A1 Feb. 24, 2022

(30) Foreign Application Priority Data

Aug. 21, 2020 (EP) .................................. 20192053

(51) Int. Cl.
| | |
|---|---|
| C25B 11/091 | (2021.01) |
| C25B 1/04 | (2021.01) |
| C25B 9/17 | (2021.01) |
| C25B 9/67 | (2021.01) |
| C25B 11/037 | (2021.01) |
| C25B 15/021 | (2021.01) |
| C25B 15/08 | (2006.01) |

(52) U.S. Cl.
CPC .............. *C25B 11/091* (2021.01); *C25B 1/04* (2013.01); *C25B 9/17* (2021.01); *C25B 9/67* (2021.01); *C25B 11/037* (2021.01); *C25B 15/021* (2021.01); *C25B 15/083* (2021.01)

(58) Field of Classification Search
CPC ........... C25B 11/091; C25B 1/04; C25B 9/17; C25B 9/67; C25B 11/037; C25B 15/021; C25B 15/083; Y02E 60/32; Y02E 60/36; C01B 3/0031; C01B 3/08; C01B 3/0078
See application file for complete search history.

(56) References Cited

U.S. PATENT DOCUMENTS

| | | |
|---|---|---|
| 3,942,511 A | 3/1976 | Black et al. |
| 5,256,501 A | 10/1993 | Hasvold et al. |
| 5,285,798 A | 2/1994 | Banerjee et al. |
| 2005/0098033 A1* | 5/2005 | Mallavarapu ........ B01D 53/047 95/96 |
| 2008/0274671 A1 | 11/2008 | ODonoghue et al. |
| 2009/0011297 A1 | 1/2009 | Jang et al. |
| 2009/0075156 A1 | 3/2009 | Long et al. |
| 2009/0280054 A1* | 11/2009 | Parker ................ C01B 3/08 252/182.33 |
| 2012/0301751 A1 | 11/2012 | Fertman |
| 2017/0149036 A1 | 5/2017 | Braun et al. |
| 2019/0051907 A1 | 2/2019 | Cui |
| 2020/0373583 A1 | 11/2020 | Enjoji |

FOREIGN PATENT DOCUMENTS

JP 2014028712 A * 2/2014

OTHER PUBLICATIONS

Zhang, Peili, et al.; "Electroless plated Ni-Bx films as highly active electrocatalysts for hydrogen production from water over a wide pH range," Nano Energy, vol. 19, pp. 98-107, Jan. 2016.
U.S. Appl. No. 17/107,412.
U.S. Appl. No. 17/180,403.
U.S. Appl. No. 17/332,624.
Sathe, Bhaskar R., et al.; "Metal-free B-doped graphene with efficient electrocatalytic activity for hydrogen evolution reaction"; Catalysis Science & Technology 4.7; 2014.
Figueiredo-Filho, Luiz CS, et al.; "Electroanalytical performance of a freestanding three-dimensional graphene foam electrode"; Electroanalysis 26; 214.
European Patent Office, Communication Pursuant to Article 94(3) EPC, dated Jan. 19, 2021 in Patent Application No. EP20192053, which is a foreign counterpart application to this U.S. Patent Application to which this application claims priority.
Khrussanova, M. et al.; "Hydriding of Mechanically Alloyed Mixtures of Magnesium with MnO2, Fe2O3 and NiO"; downloaded on Aug. 23, 2021 at https://www.sciencedirect.com/science/article/abs/pii/0025540891900987; Jul. 1991.
Wang, Jiasheng, et al.; "Effects of Fe Modified Na2WO4 Additive on the Hydrogen Storage Properties of MgH2"; downloaded Aug. 23, 2021 at https://link.springer.com/article/10.1007/s11595-019-2155-2?utm_source=xmol&utm_medium=affiliate&utm_content=meta&utm_campaign=DDCN_1_GL01_metadata; Oct. 2019.

* cited by examiner

*Primary Examiner* — Jacob M Amick
*Assistant Examiner* — Charles J Brauch
(74) *Attorney, Agent, or Firm* — Kolitch Romano Dascenzo Gates LLC

(57) ABSTRACT

A hydrogen generating element of an electrochemical apparatus may include a compacted homogenous body of an alloy-like material which contains at least 60 wt.-%, preferably more than 75 wt.-%, of Mg or a Mg alloy, 5 to 20 wt.-% $Fe_2O_3$, and 5 to 20 wt.-% of an electrolyte precursor material.

18 Claims, No Drawings

HYDROGEN GENERATING ELEMENT

SUMMARY

The present disclosure provides systems, apparatuses, and methods relating to hydrogen generating elements.

In some examples, a hydrogen generating element of an electrochemical apparatus may include: a compacted homogenous body including an alloy-like material which contains at least 60 wt.-% of Mg or a Mg alloy, 5 to 20 wt.-% $Fe_2O_3$, and 5 to 20 wt.-% of an electrolyte precursor material.

In some examples, an electrochemical apparatus for producing hydrogen and/or heat may include: a vessel having a gas outlet; and at least one hydrogen generating element disposed in the vessel; wherein a hydrogen-containing liquid is disposed in the vessel and at least partially surrounds the hydrogen generating element; and wherein the at least one hydrogen generating element includes a compacted homogenous body including an alloy-like material which contains at least 60 wt.-% of Mg or a Mg alloy, 5 to 20 wt.-% Fe2O3, and 5 to 20 wt.-% of an electrolyte precursor material.

Features, functions, and advantages may be achieved independently in various embodiments of the present disclosure, or may be combined in yet other embodiments, further details of which can be seen with reference to the following description and drawings.

DETAILED DESCRIPTION

Various aspects and examples of hydrogen generating elements, as well as related methods, are described below and illustrated in the associated drawings. Unless otherwise specified, a hydrogen generating element in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"Providing," in the context of a method, may include receiving, obtaining, purchasing, manufacturing, generating, processing, preprocessing, and/or the like, such that the object or material provided is in a state and configuration for other steps to be carried out.

"wt.-%" means percentage by weight.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Examples, Components, and Alternatives

The following sections describe selected aspects of illustrative hydrogen generating elements as well as related systems and/or methods. The examples in these sections are intended for illustration and should not be interpreted as limiting the scope of the present disclosure. Each section may include one or more distinct embodiments or examples, and/or contextual or related information, function, and/or structure.

The present disclosure relates to a hydrogen generating element suitable for use in in an electrochemical apparatus for generating hydrogen. Furthermore, the disclosure relates to a process of making such element and to the use of such element.

In the framework of the wide-spread massive efforts to replace fossil fuels by alternative fuels to reduce pollution resulting from the burning of fossil fuels, hydrogen has gained growing attention over the last years. This is because hydrogen is a very environment-friendly product, the burning thereof resulting in no pollution at all, and has a very high energy content per mass unit.

Nevertheless, so far hydrogen has not gained wide-spread usage as a fuel, due to a number of technological and logistic problems which have not yet been solved satisfactorily. Although many methods for producing hydrogen gas have been known, including the electrolysis of water, gasification of coal, steam reforming of natural gas, partial oxidation of heavy oils, and the use of solar energy and nuclear reactor heat to break down steam into its component elements, for many possible applications such methods are not fully appropriate or need essential improvement to become competitive.

In particular, with most of the above-referenced methods there is a "gap" between production and use of the hydrogen, in terms of the respective sites and times, and this results in severe problems of storage, transportation, and safety.

The present disclosure provides an improved hydrogen generating element for use in a hydrogen generating apparatus, a process for making such element, and a method of making use of such element.

According to a product aspect of the invention, the hydrogen generating element comprises a compacted homogenous body of an alloy-like material which contains at least 60 wt.-%, preferably more than 75 wt.-% of Mg or a Mg alloy, 5 to 20 wt.-% $Fe_2O_3$, and 5 to 20 wt.-% of an electrolyte precursor material.

Whereas it is well-known that magnesium, aluminum or zinc and alloys of these materials generate hydrogen in an electrochemical process, it is state of the art to combine such materials with another elemental metal like iron and nickel, or carbon. Typically, one or more hydrogen generating element(s) on the one hand and one or more "passive" element(s) are arranged spaced apart in an electrolyte solution, to produce hydrogen and/or electrical energy.

In U.S. Pat. No. 4,264,362, it is disclosed to combine the above-referenced metals into a compacted disk-shaped or cylindrical single body which is immersed in seawater to produce heat and hydrogen.

The inventors, however, found that iron oxide, rather than elemental iron, can provide better results in a hydrogen generating process, and that the addition of an electrolyte precursor material to such hydrogen generating body can provide for a much wider usage with many kinds of fluids which in their chemical composition contain hydrogen, far beyond seawater or pre-manufactured electrolyte solutions. This provides for an extremely wide range of applications for producing hydrogen on-demand, exactly on that site and at that time where and when it is needed.

It should be noted that the above-referenced values for the content of the several constituents of the hydrogen generating element are most suitable values, according to the experiments of the inventors. Nevertheless, deviating compositions are within the scope of the present disclosure.

Please also note that the wording "alloy-like material" is intended to cover basically homogeneous solid mixtures of the constituents within a compacted element body. The wording "electrolyte precursor material" is intended to broadly designate any material which in connection with any fluid containing hydrogen atoms in its chemical structure can provide an electrolytic environment around the "active" and "passive" components of the hydrogen generating element.

According to the investigations of the inventors, potassium is a suitable electrolyte precursor material embedded into the hydrogen generating elements, nevertheless, other alkaline or earth alkaline elements in place of potassium (or in addition to potassium) are contemplated by the present disclosure.

In an embodiment of the present disclosure, the magnesium alloy contains aluminum. In this regard, it should be mentioned that alternatively magnesium or an aluminum-free magnesium alloy powder can be used to form the hydrogen generating element, in which case aluminum or aluminum alloy powder can be separately added to the powder mixture for forming the hydrogen generating element.

In their experiments, the inventors have obtained a very high hydrogen yield and reasonable timing (including a fast start) of the hydrogen generation with a hydrogen generating element comprising 80 wt.-% of an Mg alloy, 10 to 15 wt.-% $Fe_2O_3$ and 5 to 10 wt.-% K. Nevertheless, embodiments with deviating chemical compositions are contemplated by the present disclosure.

In geometrical embodiments of the present disclosure, the hydrogen generating element can have the shape of a sphere or prism or cylinder, the height of which is at least approximately the same as its diameter or edge length, respectively. Hydrogen generating elements of such shape can easily be formed by press molding or extrusion methods, easily be transported without significant damage and easily be fed into an apparatus for producing hydrogen.

In the experiments of the inventors, elements having a diameter or length and diameter or length and edge length, respectively, between 10 and 30 mm, preferably between 15 and 25 mm, have been proven as very promising. Hydrogen generating elements of such size are in particular usable in smaller hydrogen generating apparatuses, e.g., hand-held apparatuses, and can be carried together with such apparatuses in small containers or bags, respectively.

Furthermore, the inventors have found that hydrogen generating elements made from powders of the constituents having a grain size between 20 and 200 nm, preferably between 40 and 80 nm, are favorable in terms of hydrogen yield and the timing of hydrogen production.

In an electrochemical apparatus for producing hydrogen and/or heat, at least one hydrogen generating element according to the present disclosure is contained in a vessel provided with a gas outlet, and a hydrogen containing liquid, in particular an aqueous liquid, like pure water, tap water, sea water, urine or similar, is disposed in the vessel to at least partially surround the element. The term "hydrogen containing liquid" is intended to cover, besides the above-referenced aqueous liquids, even non-aqueous liquids which, however, contain hydrogen in their chemical compositions. Such liquids can be liquid hydrocarbons or even liquids or pastes which contain a certain amount of hydrocarbons.

An embodiment of the apparatus comprises a hydrogen generating apparatus having a control valve in the gas outlet. Such control valve serves for delivering the hydrogen generated within the apparatus over some time exactly on demand, i.e., at a certain point in time at a required flow rate.

In a further embodiment, the apparatus comprises a high-pressure vessel provided with a high-pressure outlet tube for transporting pressurized hydrogen to the outside of the vessel for use. Such embodiment can serve for providing a quite high amount of pre-stored hydrogen, which is under high pressure, within a short time, e.g. for driving some vehicle a predetermined distance.

In some embodiments, the apparatus comprises a heat generating apparatus having heat conduction device(s) for transporting heat generated by an extrathermal reaction within the vessel to the outside thereof for use. Such conduction device(s) can be cooling rips for conducting the heat into the ambient air of the apparatus, a cooling liquid into which the vessel of the apparatus is at least partly immersed, and/or any other suitable device(s) for drawing thermal energy out of a hot body.

In a useful embodiment, which is in particular suitable for providing lower amounts of hydrogen on-demand for a large range of applications, the apparatus is transportable and, in particular, is a hand-held apparatus. It can be combined with a fuel cell apparatus, the hydrogen input of which is directly connected to the gas outlet of the hydrogen generating apparatus. In this way, at least part of the generated hydrogen can immediately be used to produce electrical energy.

According to a process aspect of the present disclosure, a process of making the hydrogen generating element comprises providing Mg or a Mg alloy, $Fe_2O_3$ and an electrolyte precursor material in the respective weight ratios, ball-milling the mixed Mg or Mg alloy, $Fe_2O_3$ and electrolyte precursor material, preferably between 5 and 30 mins, until a homogenous mixed powder of the constituents is achieved, disposing an appropriate amount of the mixed powder in a compression mold of a compacting press, and pressing the mixed powder with a pressure in the range between 5 and 15 tons.

In an embodiment, the process of making the hydrogen generating element comprises providing Mg or a Mg alloy, $Fe_2O_3$ and an electrolyte precursor material in the respective weight ratios, and a binder, ball-milling the mixed Mg or Mg alloy, $Fe_2O_3$, and electrolyte precursor material, preferably between 5 and 30 mins, until a homogenous mixed powder of the constituents is achieved, continuously feeding the mixed powder into an extruder apparatus and extruding a cylindrical or prismatic bar of the compacted material from the extruder, and cutting the extruded bar into pieces.

In an embodiment, the process of making the hydrogen generating element comprises providing Mg or a Mg alloy, $Fe_2O_3$ and an electrolyte precursor material in the respective weight ratios, and a binder, ball-milling the mixed Mg or Mg alloy, $Fe_2O_3$, electrolyte precursor material, and binder, preferably between 5 and 30 mins, until a homogenous mixed powder of the constituents is achieved, continuously feeding the mixed powder into an extruder apparatus and extruding a cylindrical or prismatic bar of the compacted material from the extruder, and cutting the extruded bar into pieces.

It should be noted that, beyond the above-referenced ball-milling, other methods of producing fine grain powders of the constituents can be applied, depending on the specific conditions and requirements of the process, and that beyond the mold-pressing and extrusion techniques other methods for forming a compacted body of a definite geometrical shape may be used within the process.

An example use of the hydrogen generating element comprises periodically feeding at least one hydrogen generating element into a vessel of an electrochemical apparatus which is at least partly filled with a hydrogen containing liquid, in particular an aqueous liquid, like pure water, tap water, sea water, urine and/or similar, to provide for a continuous production of hydrogen over a longer period of time, if appropriate.

An example method of making such use of a hydrogen generating element comprises measuring a flow rate of hydrogen at a gas outlet of a vessel of the apparatus or a hydrogen pressure and/or a temperature inside the vessel and controlling the feeding of the hydrogen generating elements into the vessel in dependence on (e.g., based on) the hydrogen flow rate or hydrogen pressure and/or temperature.

In the above-referenced embodiment, wherein the hydrogen generating apparatus is combined with a fuel cell, the feeding of the hydrogen generating elements into the vessel can be controlled in dependence on (e.g., based on) an electrical parameter which is measured at the fuel cell and the value of which indicates that the amount of hydrogen produced in the apparatus should be increased.

The above embodiments and aspects of the present disclosure are not determined to restrict the scope of the appending claims but to illustrate preferred configurations and applications of the present disclosure. In particular, any combinations of the features of the claims and of the above-mentioned embodiments and aspects, which are within the skills of one of ordinary skill in the art, shall be considered as being with the scope of the present disclosure.

Illustrative Combinations and Additional Examples

This section describes additional aspects and features of hydrogen generating elements and associated methods, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A0. A hydrogen generating element of an electrochemical apparatus, the element comprising a compacted homogenous body of an alloy-like material which contains at least 60 wt.-%, preferably more than 75 wt.-% of Mg or a Mg alloy, 5 to 20 wt.-% $Fe_2O_3$, and 5 to 20 wt.-% of an electrolyte precursor material.

A1. The hydrogen generating element of paragraph A0, wherein the electrolyte precursor material is K.

A2. The hydrogen generating element of any one of paragraphs A0-A1, wherein the Mg alloy contains 5 to 25 wt.-% AI.

A3. The hydrogen generating element of paragraph A1, comprising 80 wt.-% of an Mg alloy, 10 to 15 wt.-% $Fe_2O_3$ and 5 to 10 wt.-% K.

A4. The hydrogen generating element of any one of paragraphs A0-A3, having the shape of a sphere, or of a prism or a cylinder the height of which is substantially the same as its edge length or diameter, respectively.

A5. The hydrogen generating element of paragraph A4, wherein the diameter of the sphere, or the height and edge length of the prism, or the height and diameter of the cylinder, is between 10 and 30 mm, preferably between 15 and 25 mm.

A6. The hydrogen generating element of any one of paragraphs A0-A5, made from powders of the constituents having a grain size between 20 and 200 nm, preferably between 40 and 80 nm.

B0. An electrochemical apparatus for producing hydrogen and/or heat, the apparatus comprising:
a vessel provided with a gas outlet,
at least one hydrogen generating element (e.g., of any one of paragraphs A0-A6) contained in the vessel,
a hydrogen containing liquid, in particular an aqueous liquid, like pure water, tap water, sea water, urine or similar, filled in the vessel to surround the element.

B1. The electrochemical apparatus of paragraph B0, adapted as a hydrogen generating apparatus having a control valve in the gas outlet.

B2. The electrochemical apparatus of paragraph B1, adapted as a high-pressure vessel provided with a high-pressure outlet tube for transporting pressurized hydrogen to the outside of the vessel for use.

B3. The electrochemical apparatus of any one of paragraphs B0-B2, adapted as a heat generating apparatus having heat conduction feature(s) for transporting heat generated by an extrathermal (i.e., exothermic) reaction within the vessel to the outside thereof for use.

C0. A process of making a hydrogen generating element (e.g., of any one of paragraphs A0-A6), the process comprising:
providing Mg or a Mg alloy, $Fe_2O_3$ and an electrolyte precursor material (e.g., in the respective weight ratios set forth in one of paragraphs A0-A6),
ball-milling the mixed Mg or Mg alloy, $Fe_2O_3$ and electrolyte precursor material, preferably between 5 and 30 mins, until a homogenous mixed powder of the constituents is achieved,
disposing an appropriate amount of the mixed powder in a compression mold of a compacting press, and
pressing the mixed powder with a pressure in the range between 5 and 15 tons.

D0. A process of making a hydrogen generating element (e.g., of any one of paragraphs A0-A6), the process comprising:
providing Mg or a Mg alloy, $Fe_2O_3$ and an electrolyte precursor material (e.g., in the respective weight ratios set forth in one of paragraphs A0-A6), and a binder, ball-milling the mixed Mg or Mg alloy, $Fe_2O_3$, electrolyte precursor material, and binder, preferably between 5 and 30 mins, until a homogenous mixed powder of the constituents is achieved, continuously feeding the mixed powder into an extruder apparatus and extruding a cylindrical or prismatic bar of the compacted material from the extruder, and cutting the extruded bar into pieces.

E0. A method of using at least one hydrogen generating element (e.g., of any one of paragraphs A0-A6), the method comprising periodically feeding the at least one element into a vessel of an electrochemical apparatus which is at least partly filled with a hydrogen containing liquid, in particular an aqueous liquid, like pure water, tap water, sea water, urine or similar.

E1. The method of paragraph E0, further comprising:

measuring a flow rate of hydrogen at a gas outlet of the vessel of the apparatus or a hydrogen pressure and/or a temperature inside the vessel, and controlling the feeding of the at least one hydrogen generating element into the vessel in dependence on the hydrogen flow rate or the hydrogen pressure and/or temperature.

F0. A method of making a hydrogen generating element, the method comprising:

ball-milling a mixture of at least 60 wt.-% Mg or a Mg alloy; 5 to 20 wt.-% $Fe_2O_3$; and 5 to 20 wt.-% of an electrolyte precursor material until a homogenous mixed powder is achieved;

disposing a selected portion of the mixed powder into a compression mold of a compacting press; and pressing the mixed powder with a pressure in the range of 5 to 15 tons.

F1. The method of F0, wherein the mixture comprises more than 75 wt.-% of the Mg or the Mg alloy.

G0. A method of making a hydrogen generating element, the method comprising:

ball-milling a mixture of at least 60 wt.-% Mg or a Mg alloy; 5 to 20 wt.-% $Fe_2O_3$; 5 to 20 wt.-% of an electrolyte precursor material; and a binder until a homogenous mixed powder is achieved;

continuously feeding the mixed powder into an extruder apparatus and extruding a cylindrical or prismatic bar of compacted material from the extruder apparatus; and cutting the extruded bar into pieces.

H0. A method of using at least one hydrogen generating element, the method comprising:

periodically feeding the at least one hydrogen generating element into a vessel of an electrochemical apparatus, the vessel being at least partly filled with a hydrogen containing liquid;

wherein the at least one hydrogen generating element includes a compacted homogenous body including an alloy-like material which contains at least 60 wt.-% of Mg or a Mg alloy, 5 to 20 wt.-% Fe2O3, and 5 to 20 wt.-% of an electrolyte precursor material.

H1. The method of H0, further comprising:

measuring at least one of a flow rate of hydrogen at a gas outlet of the vessel of the apparatus, or a hydrogen pressure inside the vessel, or a temperature inside the vessel; and controlling the feeding of the at least one hydrogen generating element into the vessel based on the measured hydrogen flow rate or hydrogen pressure or temperature.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A hydrogen generating element of an electrochemical apparatus, the element comprising:
a compacted homogenous body including an alloy-like material which contains at least 60 wt.-% of Mg or a Mg alloy, 5 to 20 wt.-% $Fe_2O_3$, and 5 to 20 wt.-% of an electrolyte precursor material.

2. The hydrogen generating element of claim 1, wherein the electrolyte precursor material is K.

3. The hydrogen generating element of claim 2, comprising 80 wt.-% of the Mg alloy, 10 to 15 wt.-% $Fe_2O_3$, and 5 to 10 wt.-% K electrolyte precursor material.

4. The hydrogen generating element of claim 1, wherein the alloy-like material contains the Mg alloy, and the Mg alloy contains 5 to 25 wt.-% Al.

5. The hydrogen generating element of claim 1, having the shape of a sphere, or of a prism having a first height and an edge length equal to the first height, or of a cylinder having a second height and a diameter equal to the second height.

6. The hydrogen generating element of claim 5, wherein the shape is the prism, and the first height and the edge length are in the range of 10 to 30 mm.

7. The hydrogen generating element of claim 5, wherein the shape is the cylinder, and the second height and the diameter are in the range of 10 to 30 mm.

8. The hydrogen generating element of claim 5, wherein the shape is the sphere, and the sphere has a diameter in the range of 10 to 30 mm.

9. The hydrogen generating element of claim 1, comprising a powder having a grain size of 20 to 200 nm.

10. The hydrogen generating element of claim 1, wherein the first material comprises more than 75 wt.-% of the Mg or the Mg alloy.

11. An electrochemical apparatus for producing hydrogen and/or heat, the apparatus comprising:
a vessel having a gas outlet; and
at least one hydrogen generating element disposed in the vessel;
wherein a hydrogen-containing liquid is disposed in the vessel and at least partially surrounds the hydrogen generating element; and
wherein the at least one hydrogen generating element includes a compacted homogenous body including an alloy-like material which contains at least 60 wt.-% of Mg or a Mg alloy, 5 to 20 wt.-% Fe2O3, and 5 to 20 wt.-% of an electrolyte precursor material.

12. The electrochemical apparatus of claim 11, further comprising a control valve in the gas outlet.

13. The electrochemical apparatus of claim 12, configured as a high-pressure vessel having a high-pressure outlet tube configured to transport pressurized hydrogen out of the vessel for use.

14. The electrochemical apparatus of claim 11, configured as a heat generating apparatus including at least one heat conduction device for transporting heat generated by an exothermic reaction within the vessel outside the vessel for use.

15. The electrochemical apparatus of claim 11, wherein the hydrogen-containing liquid is an aqueous liquid.

16. A hydrogen generating element of an electrochemical apparatus, the element comprising:
- a compacted homogenous body consisting essentially of an alloy-like material which contains at least 60 wt.-% of Mg or a Mg alloy, 5 to 20 wt.-% $Fe_2O_3$, and 5 to 20 wt.-% of an electrolyte precursor material.

17. The hydrogen generating element of claim 1, wherein the electrolyte precursor comprises an elemental substance.

18. The hydrogen generating element of claim 17, wherein the electrolyte precursor consists of an alkaline element or an earth alkaline element.

* * * * *